(12) United States Patent
Hirabayashi (10) Patent No.: US 9,030,622 B2
(45) Date of Patent: May 12, 2015

(54) ELECTRO-OPTIC DEVICE AND ELECTRONIC APPARATUS

(75) Inventor: Hidekazu Hirabayashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 404 days.

(21) Appl. No.: 13/033,906

(22) Filed: Feb. 24, 2011

(65) Prior Publication Data

US 2011/0211152 A1 Sep. 1, 2011

(30) Foreign Application Priority Data

Mar. 1, 2010 (JP) ................................ 2010-043849

(51) Int. Cl.
| | | |
|---|---|---|
| G02F 1/1333 | (2006.01) | |
| F21V 7/04 | (2006.01) | |
| G03B 33/12 | (2006.01) | |
| G03B 21/14 | (2006.01) | |

(52) U.S. Cl.
CPC .......... *G03B 33/12* (2013.01); *G02F 1/133308* (2013.01); *G02F 2001/133311* (2013.01); *G02F 2001/133317* (2013.01); *G03B 21/14* (2013.01)

(58) Field of Classification Search
USPC ............................ 349/5, 58, 60; 363/632–634
See application file for complete search history.

(56) References Cited

U.S. PATENT DOCUMENTS

| | | | |
|---|---|---|---|
| 6,414,781 B1 | 7/2002 | Saitoh | |
| 6,906,774 B2* | 6/2005 | Saitoh | 349/153 |
| 7,369,293 B2* | 5/2008 | Miyashita | 359/254 |
| 7,651,244 B2* | 1/2010 | Suzuki | 362/293 |
| 2002/0131141 A1 | 9/2002 | Saitoh | |
| 2009/0080154 A1* | 3/2009 | Hirabayashi et al. | 361/690 |
| 2009/0201468 A1* | 8/2009 | Tanaka | 353/31 |
| 2009/0247236 A1* | 10/2009 | Kajiwara et al. | 455/566 |

FOREIGN PATENT DOCUMENTS

| | | | | |
|---|---|---|---|---|
| JP | 64-091114 A | 4/1989 | | |
| JP | 04-009983 A | 1/1992 | | |
| JP | 10-186333 A | 7/1998 | | |
| JP | 2000-193947 A | 7/2000 | | |
| JP | 2000-347168 A | 12/2000 | | |
| JP | 2002-296568 A | 10/2002 | | |
| JP | 2003-279954 A | 10/2003 | | |
| JP | 2004-004397 A | 1/2004 | | |
| JP | 2004-053964 A | 2/2004 | | |
| JP | 2004062197 A * | 2/2004 | ............ | G03B 21/00 |
| JP | 2004-341455 A | 12/2004 | | |
| JP | 2005-134567 A | 5/2005 | | |
| JP | 2007121505 A * | 5/2007 | | |
| JP | 2007-199153 A | 8/2007 | | |
| JP | 2007-206364 A | 8/2007 | | |
| JP | 2009192564 A * | 8/2009 | | |
| JP | 2011-158823 A | 8/2011 | | |

* cited by examiner

*Primary Examiner* — Hoan C Nguyen
(74) *Attorney, Agent, or Firm* — ALG Intellectual Property, LLC (57) ABSTRACT

An electro-optic device including an electro-optic panel, a dust-proof substrate attached to one of surfaces of the electro-optic panel, and a holding member having a supporting portion that supports an end portion of the dust-proof substrate and a main body portion arranged so as to surround the electro-optic panel.

39 Claims, 7 Drawing Sheets

LIGHT SOURCE
LIGHT

FIG. 10

ELECTRO-OPTIC DEVICE AND ELECTRONIC APPARATUS

BACKGROUND

1. Technical Field

The present invention relates to a technical field of electro-optic devices such as liquid crystal light valve and electric apparatus having the electro-optic device such as liquid crystal projectors.

2. Related art

An electro-optic device of this type is configured in such a manner that an electro-optic panel such as a liquid crystal panel is mounted or stored in a mounting case and is used as a light valve for a liquid crystal projector, for example. For example, in JP-A-2005-134567, a reflective liquid crystal panel is fixed from an opposite side of an incident surface where a light source light enters using a holding member formed integrally with a heat radiating member.

However, in JP-A-2005-134567, there is a technological problem that color shading occurs in an image displayed on the liquid crystal panel due to a stress generated in the holding member and transmitted to the liquid crystal panel, whereby the quality of the displayed image is lowered. For example, when the electro-optic device of this type is mounted to an electronic apparatus such as a liquid crystal projector, the holding member may be mounted to a wall surface or the like of the electronic apparatus with a bolt or the like. When tightening with the bolt, a distortion corresponding to the tightening force is generated in the holding member, a stress is generated. When heat exceeding the heat radiating performance of the heat radiating member is generated, a stress is generated also by the deformation of the holding member (that is, thermal expansion). When the stress as described above is transmitted to the liquid crystal panel, a gap between substrates of the liquid crystal panel is varied, thereby occurring color shading in the displayed image.

SUMMARY

An advantage of some aspects of the invention is to provide an electro-optic device which is capable of displaying high quality images with less color shading by restraining a stress generated in the interior of the device, and electronic apparatus having such the electro-optic device.

According to a first aspect of the invention, there is provided an electro-optic device including an electro-optic panel, a dust-proof substrate attached to one of surfaces of the electro-optic panel, and a holding member having a supporting portion that supports an end portion of the dust-proof substrate and a main body portion arranged so as to surround the electro-optic panel.

The electro-optic panel according to an aspect of the invention is, for example, a liquid crystal panel and displays an image by transmitting or reflecting a light source light in a pixel area. The light source light is, for example, a white lamp, and the pixel area is irradiated therewith when it is in operation. In the pixel area, for example, a plurality of pixels are arranged in a matrix pattern, and are electrically connected to scanning lines which supplies scanning signals and data lines for supplying image signals respectively. The respective pixels control a state of alignment of electro-optic substance such as liquid crystal arranged so as to oppose thereto according to the potential of the image signals.

A "holding member" according to an aspect of the invention is a member that holds the electro-optic panel and includes a main body portion and a supporting portion.

The main body portion of the holding member is arranged so as to surround the electro-optic panel. The main body portion is typically formed so as to have a sufficient rigidity because it is a portion to protect the electro-optic panel arranged inside from external factors and allowing penetration of bolts or the like used when mounting the electro-optic device to a mounted member.

The supporting portion of the holding member supports the end portion of the dust-proof substrate. For example, since the outline shape of the dust-proof substrate is larger than the outline shape of the electro-optic panel, when the end portion of the dust-proof substrate is protruded outward from the electro-optic panel, the supporting portion comes into contact with the protruded portion, so that the electro-optic panel attached to the dust-proof substrate is supported by the supporting portion. In other words, the stress generated in the main body portion of the holding member is transmitted indirectly to the electro-optic panel via the dust-proof substrate and the supporting portion of the holding portion. Therefore, in comparison with the case where the stress is transmitted directly to the electro-optic panel from the holding member, the stress that the electro-optic panel receives can be alleviated.

The dust-proof substrate may be supported by coming into contact with the supporting portion directly or indirectly via an adhesive agent or grease. The supporting portion may be formed integrally with the main body portion or may be formed of separate members fixed to each other.

As described thus far, according to the first aspect of the invention, the electro-optic device which is not subjected to an application of the stress to the electro-optic panel and is capable of displaying a high-quality image with less color shading is achieved.

Preferably, the outline shape of the dust-proof substrate is larger than the outline shape of the electro-optic panel.

In this configuration, the supporting portion comes into contact with the end portion of the dust-proof substrate protruding outward from the electro-optic panel, so that the electro-optic panel attached to the dust-proof substrate is supported by the supporting portion. In other words, the stress generated in the main body portion of the holding member is transmitted indirectly to the electro-optic panel via the dust-proof substrate and the supporting portion of the holding portion. Therefore, in comparison with the case where the stress is transmitted directly to the electro-optic panel from the holding member, the stress that the electro-optic panel receives can be alleviated.

Preferably, the main body portion includes a mounting portion formed so as to project toward the mounted member, and the supporting portion is formed so as to be depressed in comparison with the mounting portion.

In this configuration, the main body portion includes the mounting portion projecting toward the mounted member. The mounted member is not limited as long as it is an external member to which the electro-optic device is mounted, and may take various configurations regardless of physically, mechanically or electrically. For example, when the electro-optic device is used as a light valve mounted on the electronic apparatus such as the liquid crystal projector, the mounting member is a fixing jig for fixing the light valve to the liquid crystal projector.

The mounting portion is mounted on the mounted member, for example, with bolts. In this case, the main body portion and the mounted member with which the bolts come into contact when the bolts are tightened are subjected to distortion, and hence the stress is easily generated. However, the stress generated in this manner is alleviated by the supporting portion of the holding member as described above, the hence can hardly be transmitted to the electro-optic panel. In this configuration, since the stress can be alleviated even when the holding member is compressed by the tightened bolts in this manner, the color shading in the display image on the electro-optic panel can effectively be restrained.

In contrast, since the supporting portion is provided so as to be depressed in comparison with the mounting portion, the holding member comes into contact with the mounted member only at the mounting portion when the mounting portion is mounted on the mounted member. In other words, the supporting portion does not come into contact with the mounted member when the holding member is mounted on the mounted member, so that there remains structurally an additional room on the surface of the supporting portion. In this configuration, by arranging the dust-proof substrate so as to come into contact with the additional room, the electro-optic device in the invention can be implemented in an effective layout.

Preferably, the main body portion has an opening corresponding to the pixel area of the electro-optic panel, and the supporting portion is formed along an edge of the opening.

In this configuration, the supporting portion is formed along the edge of the opening, and the supporting portion comes into contact with the entire circumference of the edge portion of the dust-proof substrate. Therefore, the dust-proof substrate and the electro-optic panel attached to the dust-proof substrate are stably fixed in the holding member.

Preferably, the supporting portion is formed so as to project from the main body portion in a convex manner in plan view.

In this configuration, since the supporting portion is formed into a projecting shape, the contact surface with respect to the dust-proof substrate can be reduced in comparison with the case where the supporting portion is widely formed. The magnitude of the stress transmitted from the supporting portion to the dust-proof substrate depends on the contact surface between the supporting portion and the dust-proof substrate. Therefore, by reducing the contact surface as described above, the stress applied to the dust-proof substrate and the electro-optic panel attached to the dust-proof substrate can be alleviated.

Preferably, the supporting portion includes an opening for adhesion, and the dust-proof substrate is fixed to the supporting portion with the adhesive agent filled in the opening for adhesion.

In this configuration, the dust-proof substrate can be fixed to the supporting portion by filing the opening for adhesion formed on the supporting portion with the adhesive agent. As described above, in order to alleviate the stress transmitted to the electro-optic panel, the contact surface between the dust-proof substrate attached to the electro-optic panel and the supporting portion is preferably reduced. However, at the same time, the stability of the dust-proof substrate supported by the supporting portion may also be impaired. In this configuration, even in such a case as well, the dust-proof substrate can be fixed to the supporting portion with the adhesive agent, so that the stress transmitted to the electro-optic panel can be alleviated while securing stability of the dust-proof substrate.

Preferably, the electro-optic device according to the first aspect of the invention further includes a light-shielding panel provided so as to come into contact with the dust-proof substrate and the main body portion from a side of the dust-proof substrate opposite from a surface attached to the electro-optic panel, and formed so as to surround at least partly the pixel area of the electro-optic panel in plan view.

In this configuration, the light-shielding panel is formed so as to surround at least partly the pixel area of the electro-optic panel. The light-shielding panel is so-called a parting panel. As the material for the light-shielding panel, a material lower in light-reflecting property than the member arranged in the periphery of the light-shielding panel (for example, the holding member) may be used.

According to an aspect of the invention, the light-shielding panel is provided so as to come into contact with the holding member and the dust-proof substrate from the side opposite from the surface of the dust-proof substrate attached to the electro-optic panel. The light-shielding panel has typically a panel shape, it has a resiliency in comparison with the holding member. Therefore, by holding the electro-optic panel with the light-shielding panel from the display surface side (that is, on the side from which the light source light enters), the stress generated in the holding member is absorbed by the resiliency of the light-shielding panel, so that the stress transmitted to the electro-optic panel can be alleviated.

Preferably, the electro-optic device according to the first aspect of the invention further includes a heat radiating member provided on the electro-optic panel on the side opposite from a surface where the dust-proof substrate is attached.

In this configuration, the heat radiating member is provided on the back surface side of the electro-optic panel so as not to hinder an optical path of the light source path involved in the image display, and is formed of a metallic material such as Aluminum (Al) or Copper (Cu). In this manner, in the heat radiating member, the heat generating in the electro-optic panel can be efficiently conducted and radiated. By improving the heat radiating property of the electro-optic panel, distortion (that is, generation of stress) of the components of the electro-optic device such as the holding member caused by heat generation can be restrained.

Preferably, the heat radiating member is formed integrally with the holding member.

In this configuration, the entire rigidity can be improved in comparison with the case where the heat radiating member and the holding member are formed as separate members. Therefore, even when the stress is generated in the electro-optic device, the stress can be restrained in comparison with the case where the heat radiating member and the holding member are formed as separate members. Therefore, the stress transmitted to the electro-optic panel can also be alleviated, so that the color shading in the displayed image can further be restrained.

Preferably, a hook member that fixes the heat radiating member to the holding member from the side of the heat radiating member opposite from a surface opposing the electro-optic panel is provided.

In this configuration, by fixing the heat generating member with the hook member, application of the stress to the electro-optic panel and the holding member can be restrained in comparison with the case where the heat radiating member is fixed, for example, with screws.

According to another configuration of the electro-optic device of the invention, the electro-optic panel is a reflective type.

In this configuration, the electro-optic panel displays an image by reflecting the light source light in the display area. The light source light is, for example, a white lamp, and the display area is irradiated therewith when it is in operation. The electro-optic panel displays an image by, for example, modulating the light incoming into the display area on the pixel-to-pixel basis, and then reflecting the modulated light by a reflection film such as Al (aluminum) film.

The electronic apparatus according to a second aspect of the invention includes the electro-optic device according to the first aspect of the invention (including other configurations).

According to the second aspect of the invention, since the electro-optic device according to the first aspect of invention is provided, various electronic apparatuses which can display a high-quality image with high reliability, such as projecting display devices, TVs, cellular phones, electronic notepads, word processors, view-finder type or monitor direct view video tape recorders, workstations, TV telephone sets, POS terminals, and touch panels can be realized. For example, the electrophoresis apparatus such as electronic paper may be realized as the electronic apparatus according to the second aspect of the invention.

Effects and other benefits of the invention will be apparent from description of exemplary embodiments described below.

BRIEF DESCRIPTION OF THE DRAWINGS

The invention will be described with reference to the accompanying drawings wherein like numbers reference like elements.

DESCRIPTION OF EXEMPLARY EMBODIMENTS

Referring now to the drawings, an embodiment of the invention will be described below. In the following embodiments, an electro-optic device having a reflective liquid crystal panel of a TFT active matrix drive system, which is an example of an electro-optic panel, is exemplified.

Electro-Optic Device

First Embodiment

Figure 1:
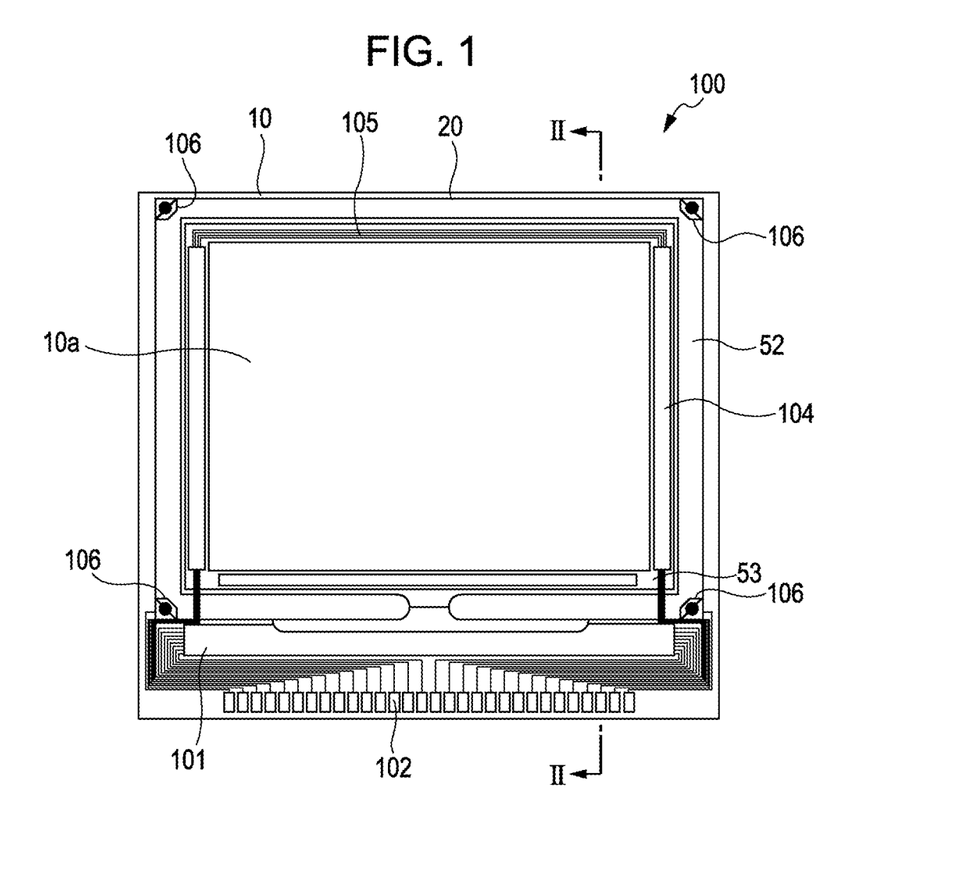
FIG. 1 is a plan view showing a general configuration of a liquid crystal panel provided in an electro-optic device according to a first embodiment.
Figure 2:
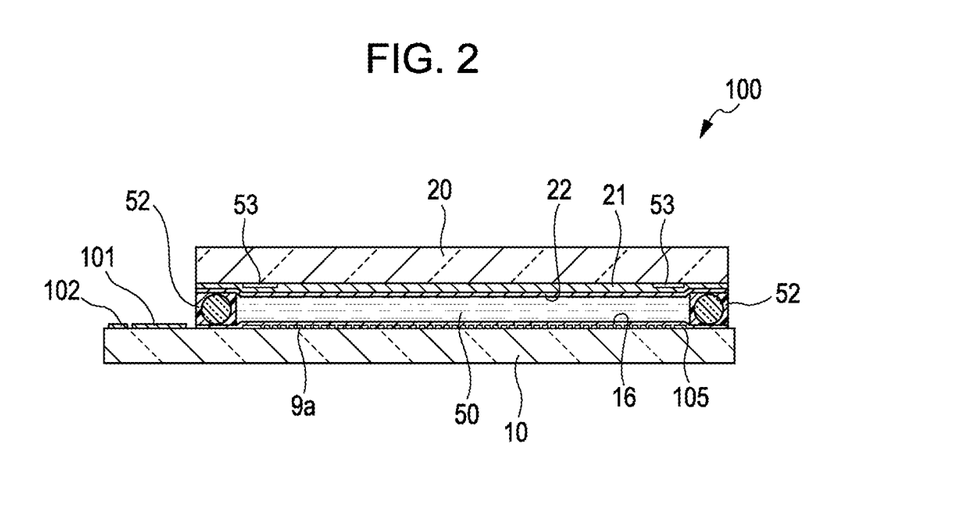
FIG. 2 is a cross-sectional view taken along the line II-II in FIG. 1.

First of all, a general configuration of a liquid crystal panel 100 provided in the electro-optic device according to the first embodiment will be described with reference to FIG. 1 and FIG. 2. FIG. 1 is a plan view showing the general configuration of the liquid crystal panel 100 provided in the electro-optic device according to the this embodiment. FIG. 2 is a cross-sectional view taken along the line II-II in FIG. 1.

The liquid crystal panel 100 is configured in such a manner that a TFT array substrate 10 and an opposed substrate 20 are arranged so as to oppose to each other. The TFT array substrate 10 is formed of a monocrystalline silicon substrate or a transparent substrate such as a glass substrate or a quartz substrate, and the opposed substrate 20 is formed of a transparent substrate such as a glass substrate or a quartz substrate. Encapsulated between the TFT array substrate 10 and the opposed substrate 20 is a liquid crystal layer 50. The liquid crystal layer 50 is formed of, for example, liquid crystal including one or more types of nematic liquid crystal mixed together and assumes a predetermined state of alignment between a pair of alignment films.

The TFT array substrate 10 and the opposed substrate 20 are bonded to each other with a sealing material 52 provided in a sealed area located around an image display area 10a having a plurality of pixel electrodes provided thereon. The image display area 10a is an example of a "pixel area" in the invention.

The sealing material 52 is formed of, for example, UV cured resin, heat cured resin for bonding the both substrates to each other, and is formed by being applied on the TFT array substrate 10 and cured by irradiation of UV light or heating in a manufacturing process. The sealing material 52 includes a gap material such as glass fibers or glass beads for fixing a distance between the TFT array substrate 10 and the opposed substrate 20 (that is, an inter-substrate gap) to a predetermined value dispersed therein. The gap material may be arranged in the image display area 10a or a peripheral area positioned in the periphery of the image display area 10a instead of or in addition to the one mixed in the sealing material 52.

A frame-like light-shielding film 53 having light-shielding properties and partly defining a frame area of the image display area 10a is provided on the side of the opposed substrate 20 inside the sealed area where the sealing material 52 is arranged so as to extend in parallel thereto. The frame-like light-shielding film 53 provided on the side of the opposed substrate 20 partly defines the image display area 10a.

In the peripheral area, a data line drive circuit 101 and an external circuit connecting terminal 102 are provided along one side of the TFT array substrate 10 in an area positioned outside the sealed area where the sealing material 52 is arranged. A scanning line drive circuit 104 is provided so as to extend along two sides adjacent to the one side and be covered with the frame-like light-shielding film 53. In addition, in order to connect the two scanning line drive circuits 104 provided on both sides of the image display area 10a in this manner, a plurality of wirings 105 are provided so as to extend along a remaining side of the TFT array substrate 10 and be covered with the frame-like light-shielding film 53.

Arranged in areas opposing four corners of the opposed substrate 20 on the TFT array substrate 10 are vertically conducting terminals 106 for connecting the both substrates with vertically conducting members 107. Accordingly, electrical conduction is achieved between the TFT array substrate 10 and the opposed substrate 20.

As shown in FIG. 2, a laminated structure is formed on the TFT array substrate 10. The laminated structure includes a TFT for switching pixels as a drive element, and the wirings such as scanning lines and data lines built therein. Although a detailed configuration of the laminated structure is not illustrated in FIG. 2, a reflective pixel electrode 9a as a reflective electrode is provided on the laminated structure. The pixel electrodes 9a are formed of a material having high light-reflecting properties such as aluminum as a typical example into island shape in a predetermined pattern on the pixel-to-pixel basis and reflect incident light.

The pixel electrodes 9a are formed so as to oppose the opposed electrode 21 in the image display area 10a on the TFT array substrate 10. Formed on a surface of the TFT array substrate 10 on the side where the liquid crystal layer 50 opposes, that is, on the pixel electrodes 9a is an alignment film 16 so as to cover the pixel electrodes 9a.

Formed on a surface of the opposed substrate 20 opposing the TFT array substrate 10 is an opposed electrode 21 formed of the transparent material such as ITO so as to oppose the plurality of pixel electrodes 9a. A color filter, not shown in FIG. 2, may be formed in an area including an opening area and part of a non-opening area for color display in the image display area 10a. An alignment film 22 is formed on the opposed electrode 21 on the surface of the opposed substrate 20 opposing to the TFT array substrate 10. It is also possible to form a light-shielding film in a grid pattern or a stripe pattern on the opposed substrate 20 to provide the non-opening area in the same manner as the transmissive liquid crystal device.

In addition to the drive circuits such as the data line drive circuit 101 described above and the scanning line drive circuit 104, the TFT array substrate 10 shown in FIG. 1 and FIG. 2 may have a sampling circuit configured to sample image signals on image signal lines and supply the sampled image signals to data lines, a pre-charge circuit configured to supply pre-charged signals of a predetermined voltage level respectively to a plurality of the data line prior to the image signals, and an evaluation circuit configured to evaluate the quality or defects of the liquid crystal panel 100 during manufacture or at the time of shipping formed thereon.

Figure 3:
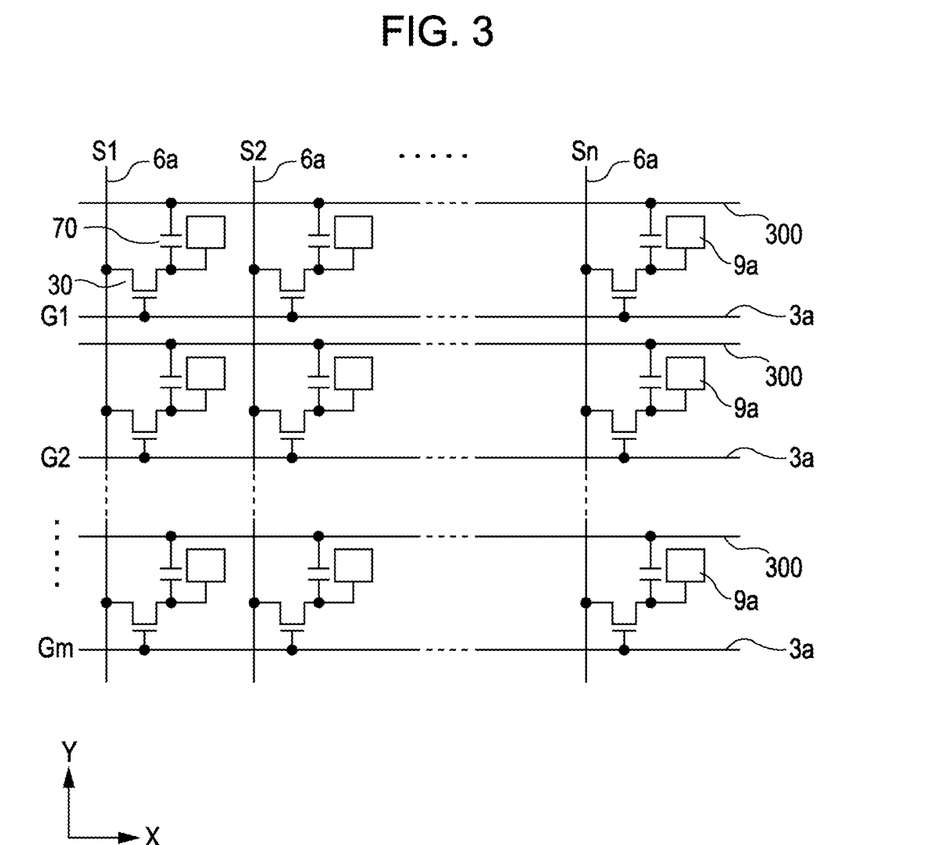
FIG. 3 is an equivalent circuit drawing showing various elements and wirings in a plurality of pixels formed into a matrix pattern which constitute an image display area of the liquid crystal panel provided in the electro-optic device according to the first embodiment.

Referring now to FIG. 3, an electric configuration of pixel portions of the liquid crystal panel 100 in the first embodiment will be described. FIG. 3 is an equivalent circuit drawing the showing various elements and wiring in the plurality of pixels formed into a matrix pattern which constitute the image display area 10a of the liquid crystal panel 100 provided in the electro-optic device according to the first embodiment.

In FIG. 3, each of the plurality of pixels formed in a matrix pattern to constitute the image display area 10a includes the pixel electrode 9a and a TFT 30. The TFT 30 is electrically connected to the pixel electrode 9a, and controls switching of the pixel electrode 9a when the liquid crystal panel 100 is in operation. Data lines 6a to which the image signals are supplied are electrically connected to a source of the TFT 30. Image signals S1, S2, . . . , Sn to be written in the data lines 6a may be supplied in the sequence of data lines, or may be supplied to a plurality of the data lines 6a adjacent to each other on a group-to-group basis.

Scanning lines 3a are electrically connected to gates of the TFTs 30, and the liquid crystal panel 100 is configured to apply scanning signals G1, G2, . . . Gm to scanning lines 3a in the sequence of the scanning lines in a pulsed manner. The pixel electrodes 9a are electrically connected to drains of the TFTs 30, and the image signals S1, S2, . . . , Sn supplied from the data lines 6a are written at a predetermined timing by closing switches of the TFTs 30 as the switching elements for a certain period. The image signals S1, S2, . . . , Sn at a predetermined level written in the liquid crystal via the pixel electrodes 9a are maintained with respect to the opposed electrodes formed on the opposed substrate for a certain period.

The liquid crystal configuring the liquid crystal layer 50 (see FIG. 2) modulates light by a change of alignment or order of molecular association according to the applied voltage level and hence is capable of providing gray scale. For example, if it is a normally white mode, the transmission factor with respect to the incident light is reduced according to the applied voltage on the pixel-to-pixel basis. In contrast, if it is a normally black mode, the transmission factor with respect to the incident light is increased according to the applied voltage on the pixel-to-pixel basis. Therefore, light having contrast according to the image signals is emitted from the liquid crystal panel 100 as a whole.

In order to prevent the image signals held here from leaking, stored capacities 70 are added in parallel to liquid crystal capacities formed between the pixel electrodes 9a and the opposed electrode 21 (see FIG. 2). The stored capacity 70 is a capacity element which functions as a maintaining capacity which temporarily maintains the potential of each pixel electrode 9a according to the supply of the image signal. One of the electrodes of the stored capacity 70 is electrically connected to the drain of the TFT 30 in parallel to the pixel electrode 9a, and the other electrode is electrically connected to a capacity line 300 having a fixed potential so as to achieve a constant potential. With the provision of the stored capacities 70, the potential maintaining characteristics in the pixel electrodes 9a are improved, so that improvement of display characteristics such as improvement of contrast and reduction of flicker is achieved.

Figure 4:
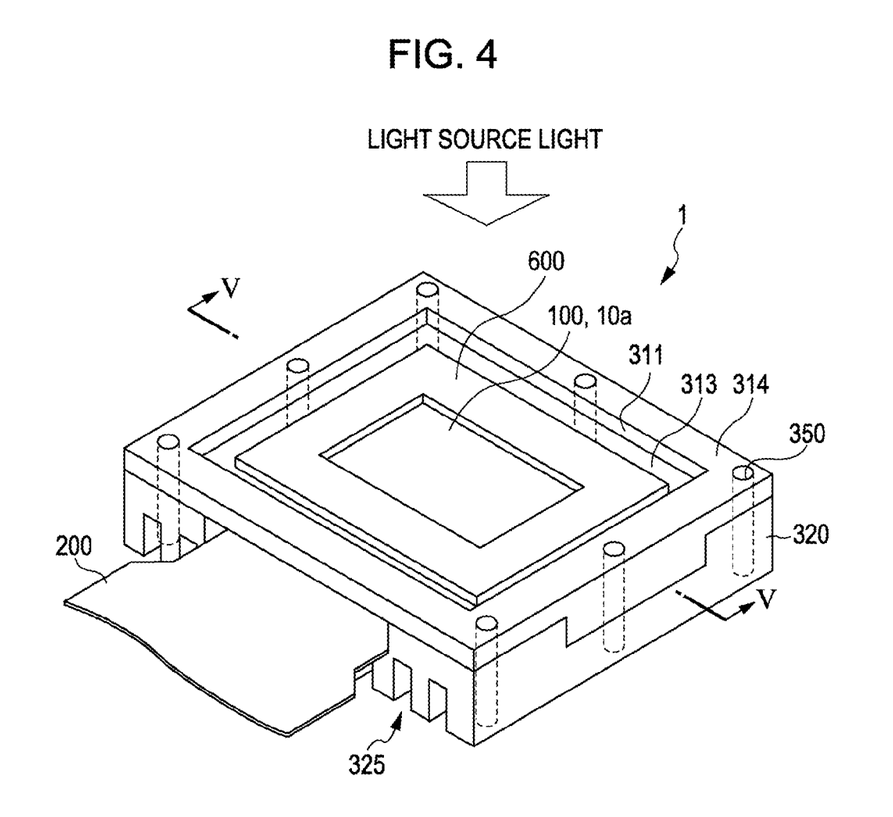
FIG. 4 is a perspective view showing a general configuration of the electro-optic device according to the first embodiment.
Figure 5:
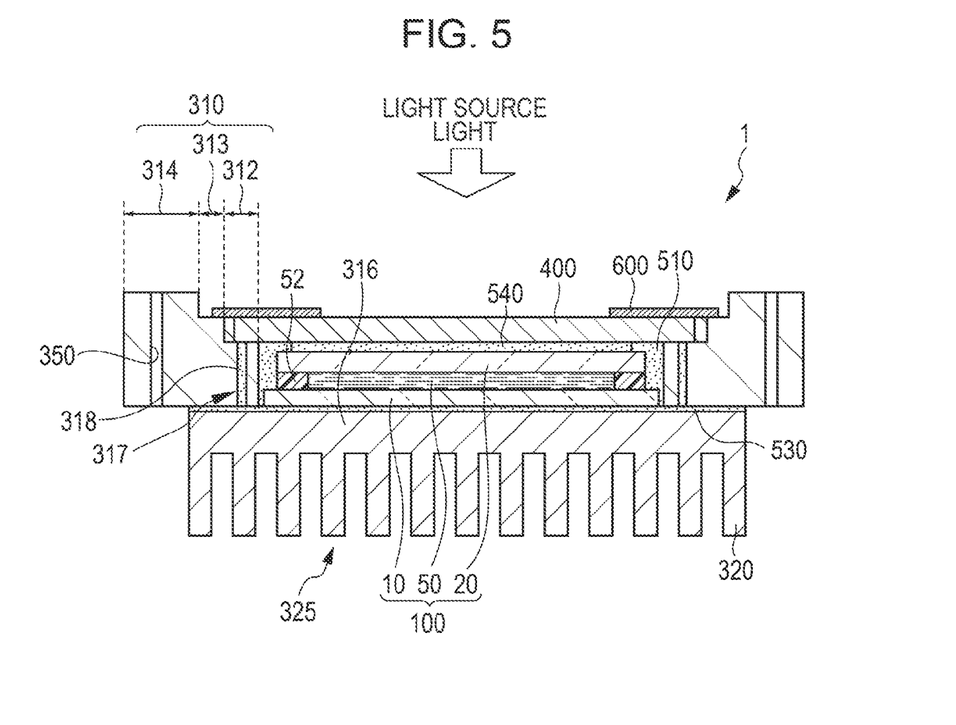
FIG. 5 is a cross-sectional view taken along the line V-V in FIG. 4.

Referring now to FIG. 4, a general configuration of the electro-optic device according to the first embodiment will be described. FIG. 4 is a perspective view showing the general configuration of the electro-optic device 1 according to the embodiment. FIG. 5 is a cross-sectional view taken along the line V-V in FIG. 4. In the drawing from FIG. 4 onward, illustration of detailed members in the liquid crystal panel 100 shown in FIG. 1 and FIG. 2 are omitted as needed.

The electro-optic device according to the first embodiment includes the liquid crystal panel 100, a flexible substrate 200, a frame 310, a heat sink 320, a dust-proof substrate 400, and a parting panel 600. The frame 310 is an example of a "holding member" in the invention, the heat sink 320 is an example of a "heat radiating member" in the invention, the dust-proof substrate 400 is an example of a "dust-proof substrate" in the invention, and a parting panel 600 is an example of a "light-shielding panel" in the invention.

Although not shown in FIG. 4 and FIG. 5, the flexible substrate 200 is joined to the external circuit connecting terminal 102 of the liquid crystal panel 100. The flexible substrate 200 is a substrate including signal wirings for feeding various control signals required for electro-optic actions of the liquid crystal panel 100 described above and, for example, is formed with the signal wirings or the like patterned on a base member such as polyimide. A driving IC chip including at least part of the drive circuit for driving the liquid crystal panel 100 may be arranged on the flexible substrate 200. One end of the flexible substrate 200 opposite from the other end connected to the liquid crystal panel 100 is pulled outward of the frame 310 and the heat sink 320, and is connected to an external circuit (not shown) for supplying the various control signals required for the electro-optic actions of the liquid crystal panel 100.

The frame 310 includes a first supporting portion 312 as a portion where the dust-proof substrate 400 is arranged, a second supporting portion 313 as a portion where the parting panel 600 is arranged, and a main body portion 314 having a mounting portion for mounting the electro-optic device 1 to an external member which is an example of a "mounted member" in the invention. The frame 310 contains metal superior in head conductivity such as iron, copper, aluminum, and magnesium so as to radiate head of the liquid crystal panel 100 together with the heat sink 320 described later. The first supporting portion 312 is an example of a "supporting portion" in the invention, and the main body portion 314 is an example of a "main body portion" in the invention.

Provided on the side of the frame 310 where the light source light enters is the main body portion 314 having a plurality of screw holes 350. The screw holes 350 allow penetration of bolts, not shown, and the frame 310 can be fixed to the external member by tightening the bolts.

The first supporting portion 312 supports the dust-proof substrate 400 by coming into contact therewith from the lower side. The first supporting portion 312 is formed with a filling hole 317 for filling an adhesive agent 318 having a heat conductivity, which is an example of a heat conductive member, for fixing the dust-proof substrate 400 to the first supporting portion 312. The filling hole 317 is an example of a "opening for adhesion" in the invention. The filling hole 317 is provided so as to penetrate through the first supporting portion 312 until it reaches a plane coming into contact with the dust-proof substrate 400.

The second supporting portion 313 includes the parting panel 600 attached thereto. The parting panel 600 is provided in a window shape so as to surround the image display area 10a of the liquid crystal panel 100 as shown in FIG. 4, and prevents light from entering an area other than the image display area 10a. The parting panel 600 is formed of a material having a lower light reflection coefficient than other members which constitute the electro-optic device 1 such as the frame 310. Specifically, for example, the parting panel 600 may be formed of SUS304, which is a representative steel type of an austenitic stainless steel. The parting panel 600 is engaged with the frame 310 at an engaged portion, not shown.

The frame 310 is bonded to the liquid crystal panel 100 with an adhesive agent 510 filled therebetween.

The dust-proof substrate 400 is attached to the opposed substrate 20 of the liquid crystal panel 100 with a transparent adhesive agent 540 so as to come into contact with the first supporting portion 312 of the frame 310. The dust-proof substrate 400 has a function to protect the image display area 10a of the liquid crystal panel 100 from dust and grime.

Figure 6:
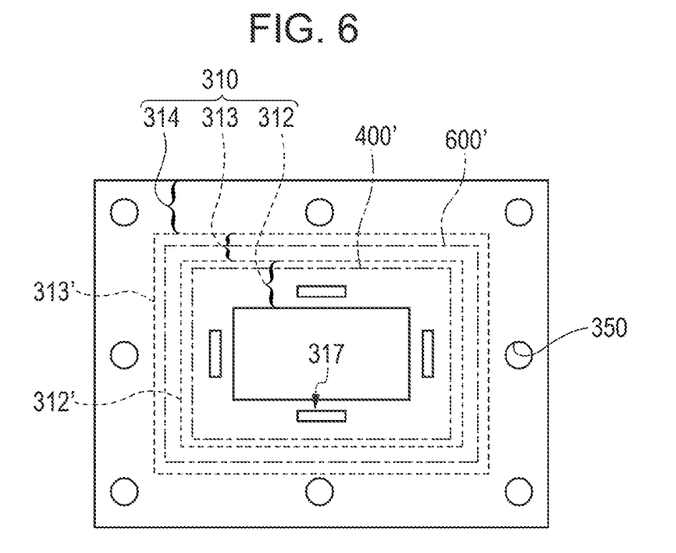
FIG. 6 is a plan view showing a frame extracted from the electro-optic device according to the first embodiment viewed from a side where a light source light enters.

Referring now to FIG. 6, the structure of the frame 310 when viewing the frame 310 from the side where the light source light enters will be described. FIG. 6 is a plan view showing the frame 310 extracted from the electro-optic device 1 and viewed from the side where the light source light enters according to the first embodiment.

In FIG. 6, the dotted lines 312' and 313' indicate boundaries of the first supporting portion 312, the second supporting portion 313, and the main body portion 314, respectively. An alternate long and short dashed line 400' indicates an outline shape of the dust-proof substrate 400, and an alternate long and short dashed line 600' indicates an outline shape of the parting panel 600.

The outline shape of the dust-proof substrate 400 is formed to be larger than that of the liquid crystal panel 100. Therefore, the first supporting portion 312 of the frame 310 is in contact with an end portion of the dust-proof substrate 400, which is protruded outward from the liquid crystal panel 100. In this manner, the first supporting portion 312 supports the dust-proof substrate 400 including the liquid crystal panel 100 attached thereto. Specifically, in the first embodiment, the stress generated in the frame 310 is transmitted indirectly to the liquid crystal panel 100 via the dust-proof substrate 400 and the first supporting portion 312, the stress that the liquid crystal panel 100 receives can be alleviated.

The main body portion 314 includes an opening corresponding to the image display area 10a when viewing the dust-proof substrate 400 from above (that is, the area surrounded by the dotted line 313'). The first supporting portion 312 and the second supporting portion 313 are formed along an edge of the opening (that is, along the entire circumference). Therefore, the dust-proof substrate 400 and the liquid crystal panel 100 attached to the dust-proof substrate 400 are stably fixed in the frame 310.

Referring back to FIG. 4 and FIG. 5 again, the heat sink 320 is arranged so as to come into contact with the liquid crystal panel 100 from the back side opposite from a display surface. The heat sink 320 includes a heat radiating portion 325 for radiating heat generated in the liquid crystal panel 100. Accordingly, occurrence of various problems such as operation failure of the liquid crystal panel 100 due to the accumulation of heat in the liquid crystal panel 100 can be prevented. The stress generated in the device can be alleviated by alleviating distortion of the components of the electro-optic device 1 caused by heat. The heat sink 320 is recommended to be formed of a material containing materials having a high thermal conductivity such as iron, copper, or aluminum in order to enhance the heat radiating effect.

The frame 310 and the liquid crystal panel 100 are attached to the heat sink 320 with an adhesive agent 530. The frame 310 and the heat sink 320 may be joined to each other at a joint portion, not shown. In this case, the joining may be achieved by fitting a depression provided on the frame 310 and a projection provided on the heat sink, or may be achieved using screws, for example. The adhesive agent 530 has a higher thermal conductivity than air and is capable of conducting heat generated in the liquid crystal panel 100 efficiently to the heat sink 320, and has a function to enhance the heat radiating performance of the heat radiating portion 325.

In the first embodiment, the adhesive agent 530 is applied so as to be filled between the liquid crystal panel 100 and the heat sink 320, and between the frame 310 and the heat sink 320. However, the adhesive agent 530 may be applied only partly, or may not be applied between the liquid crystal panel 100 and the heat sink 320, and between the frame 310 and the heat sink 320. Alternatively, instead of or in addition to the adhesive agent 530, a sheet or grease having thermal conductivity may be used.

Figure 7:
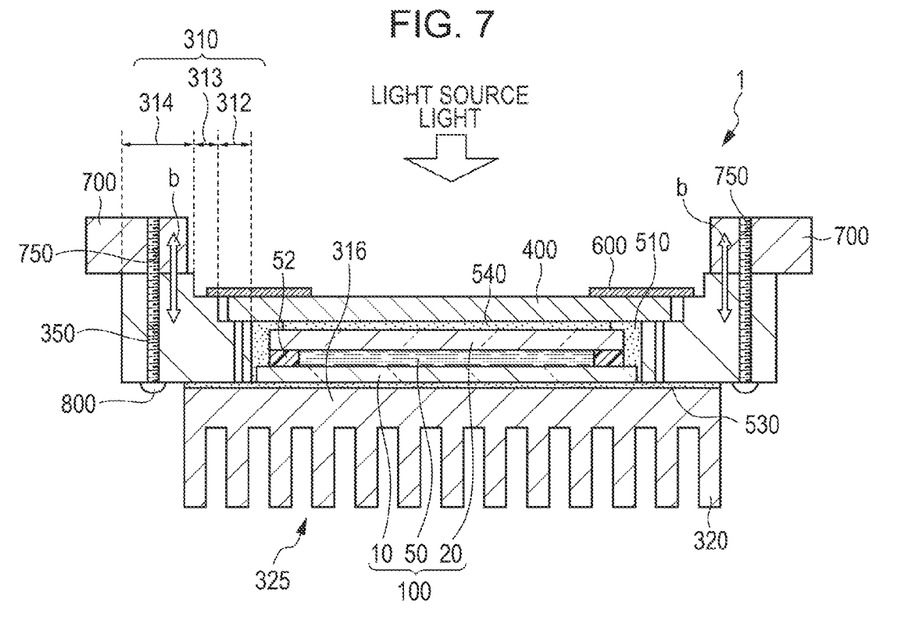
FIG. 7 is a cross-sectional view schematically showing a stress generated when the electro-optic device according to the first embodiment is mounted on an external member.

Referring now to FIG. 7, the stress generated in the electro-optic device 1 according to the first embodiment when the main body portion 314 of the frame 310 is mounted on an external member 700 will be described. FIG. 7 is a cross-sectional view schematically showing the stress to be generated in the electro-optic device 1 according to the first embodiment when the main body portion 314 of the frame 310 is mounted on the external member 700.

The external member 700 is an example of a "mounted member" in the invention and, specifically, a jig member used for mounting the electro-optic device 1 according to the first embodiment on an inner wall of a liquid crystal projector, described later, as an electronic apparatus having the electro-optic device 1, when the electro-optic device 1 is mounted as a light valve on the liquid crystal projector. The liquid crystal projector will be described later in detail.

The frame 310 is fixed to the external member 700 by tightening bolts 800 inserted so as to penetrate through the screw holes 350 formed in the frame 310 and screw holes formed in the external member 700. The each bolt 800 has a thread, not shown, cut on the surface thereof, and is capable of fixing the frame 310 to the external member 700 tightly by being rotated and tightened using a screw driver or the like.

When the bolts 800 are tightened, the stresses are generated in the interior of the electro-optic device 1. In FIG. 7, examples of the stresses generated in the frame 310 are schematically indicated by hollow arrows b. In this manner, the stressed generated in the frame 310 are transmitted to the liquid crystal panel 100 via the frame 310 and various members (for example, the first supporting portion 312 of the frame 310 or the parting panel 600).

Specifically, in the first embodiment, the dust-proof substrate 400 is formed to be wider than the liquid crystal panel 100. Therefore, the first supporting portion 312 of the frame 310 is in contact with the end portion of the dust-proof substrate 400, which is protruded outward from the liquid crystal panel 100. In this manner, the first supporting portion 312 supports the dust-proof substrate 400 including the liquid crystal panel 100 attached thereto. Specifically, in the first embodiment, the stresses generated in the frame 310 are transmitted indirectly to the liquid crystal panel 100 via the dust-proof substrate 400 and the first supporting portion 312, so that the stresses that the liquid crystal panel 100 receives are alleviated.

An example in which the frame 310 is fixed to the external member 700 by inserting the bolts 800 into the screw holes 350 and 750 has been described. Alternatively, the mounting portion of the frame 310 and the external member 700 may be secured via the adhesive agent without providing the screw holes 350 in order to alleviate the stresses transmitted from the frame 310 to the liquid crystal panel 100. It is also possible to secure the frame 310 to the external member 700 by inserting and fixing the bolts 800 to the two screw holes 350 and 750 on one diagonal line from among the mounting portions at four corners of the frame 310, and applying the adhesive agent to the remaining two mounting portions on the other diagonal line.

The dust-proof substrate 400 is held by the parting panel 600 coming into contact therewith from the opposite side of the dust-proof substrate 400 from a surface where the liquid crystal panel 100 is attached. Therefore, the stresses generated in the frame 310 are transmitted to the dust-proof substrate 400 via the parting panel 600. Since the parting panel 600 is formed into a thin plate, it can be distorted in the vertical direction more than a little when a force is applied thereto (that is, the parting panel 600 has a resiliency). Therefore, the stresses transmitted from the frame 310 to the dust-proof substrate 400 via the parting panel 600 are absorbed by the resiliency of the parting panel 600, and the stresses transmitted to the liquid crystal panel 100 attached to the dust-proof substrate 400 are alleviated.

As described thus far, in the electro-optic device according to the first embodiment, the stresses to be transmitted to the liquid crystal panel 100 are alleviated, so that occurrence of color shading of the displayed image can be prevented.

Second Embodiment

Figure 8:
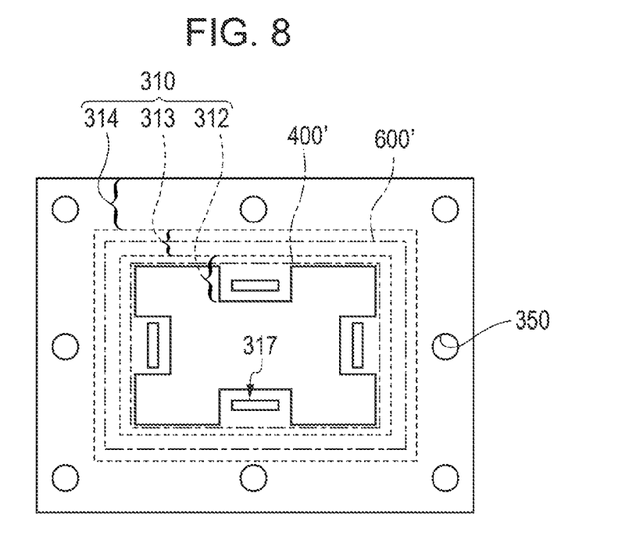
FIG. 8 is a plan view showing the frame extracted from the electro-optic device according to a second embodiment viewed from the side where a light source light enters.

Referring now to FIG. 8, the electro-optic device according to a second embodiment will be described. FIG. 8 is a plan view showing the frame 310 extracted from the electro-optic device according to the second embodiment and has the same purport as FIG. 6. In the electro-optic device according to the second embodiment, parts common to the electro-optic device 1 in the first embodiment described above are designated by the common reference numerals, and detailed description will be omitted.

In the second embodiment, the shape of the first supporting portion 312 is different from that in the first embodiment described above. In the second embodiment, the first supporting portion 312 is formed so as to protrude in a convex shape inward of the frame 310. The dust-proof substrate 400 is supported by coming into contact with a portion in the vicinity of a distal end of first supporting portion 312 protruded in the convex shape. In this manner, since the first supporting portion 312 is formed so as to protrude in the convex manner, the contact surface between the dust-proof substrate 400 and the first supporting portion 312 can be reduced in comparison with that formed as in the first embodiment (that is, along the entire circumference of the main body portion 314). Here, the magnitude of the stress transmitted from the frame 310 to the dust-proof substrate 400 depends on the contact surface between the first supporting portion 312 and the dust-proof substrate 400. Therefore, by reducing the contact surface as described above, the stress applied to the liquid crystal panel 100 attached to the dust-proof substrate 400 can be alleviated.

Third Embodiment

Figure 9:
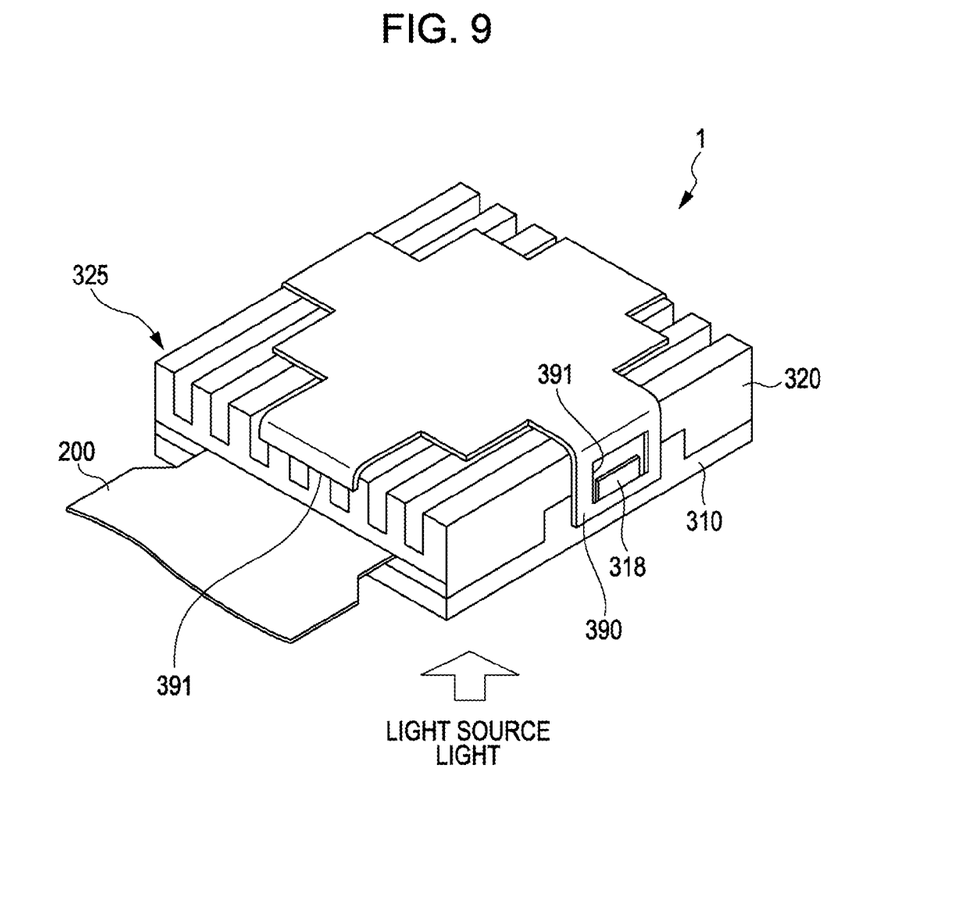
FIG. 9 is a perspective view showing a general configuration of the electro-optic device according to a third embodiment.

Referring now to FIG. 9, the electro-optic device according to a third embodiment will be described. FIG. 9 is a perspective view showing a general configuration of the electro-optic device according to the third embodiment. In the electro-optic device according to the third embodiment, parts common to the electro-optic device 1 in the first embodiment described above are designated by the common reference numerals, and detailed description will be omitted.

The third embodiment is different from the first and second embodiments in that the heat sink 320 is mounted on the frame 310 using a hook 390. The hook 390 is an example of a "hook member" in the invention. The hook 390 is fixed by hooking an opening 391 provided on a side surface with a projection 318, so that the frame 310 and the heat sink 320 are fixed. The hook 390 is supported by a supporting portion 391 provided on the frame 310 so that the position of the heat sink 320 mounted on the frame 310 is not displaced.

As regards the structures in the first and second embodiments, the heat sink 320 is firmly fixed to the frame 310 with the adhesive agent 530, the stresses generated in the frame 310 and the heat sink 320 are transmitted easily to the liquid crystal panel 100. In contrast, in the third embodiment, for example, since the heat sink 320 is fixed by hooking the hook 390 to the frame 310, the stress generated is very light. In other words, by fixing with the hook 390, the frame 310 and the heat sink 320 are hardly subjected to the distortion, so that the generation of the stress can be effectively prevented.

Since the hook 390 is provided on the opposite side from the display surface of the liquid crystal panel 100, the incident light to the image display area 10a of the liquid crystal panel 100 is not blocked. Therefore, the heat sink 320 can be fixed to the frame 310 with an efficient layout without hindering the display of the liquid crystal panel 100.

Electronic Apparatus

Figure 10:
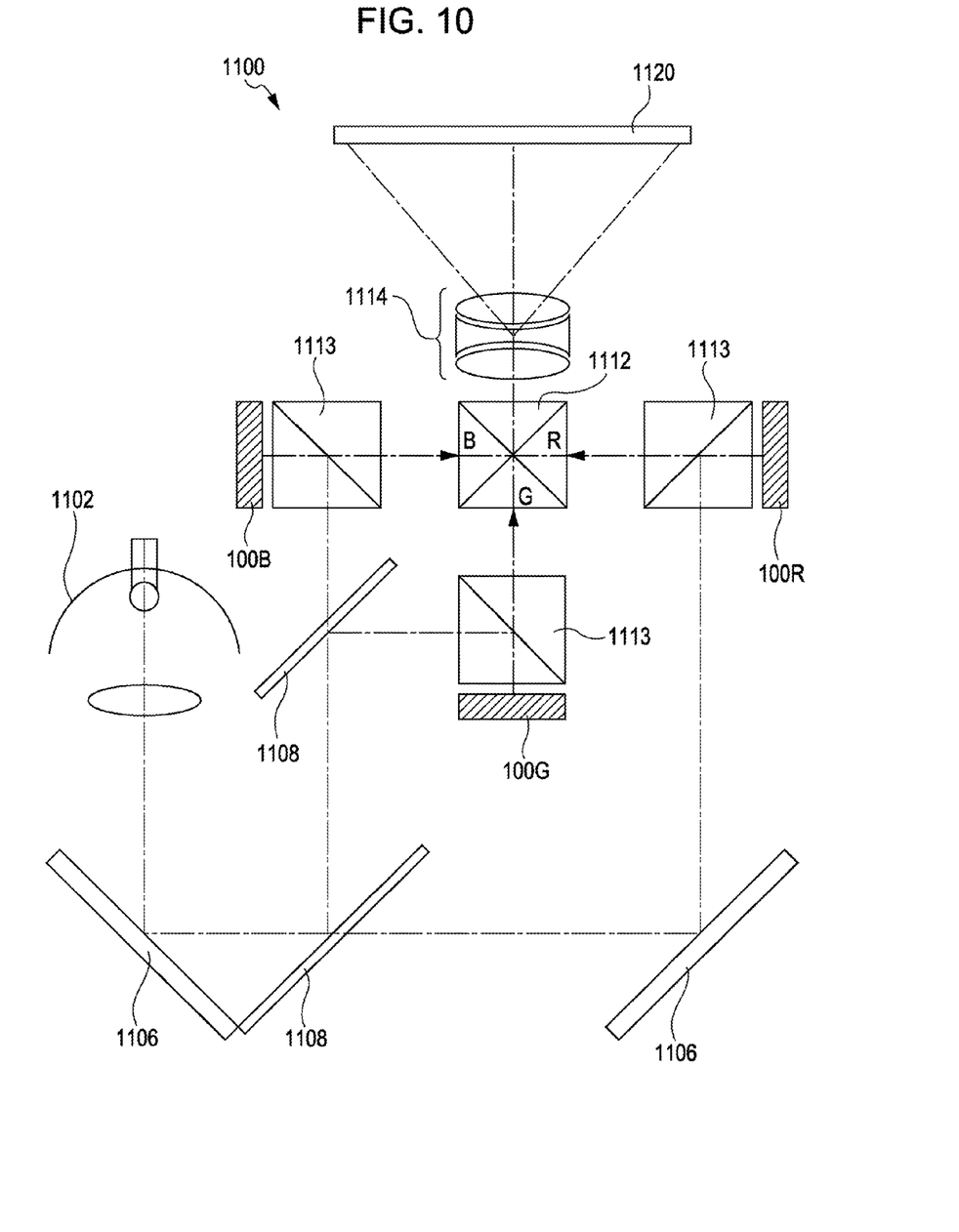
FIG. 10 is a plan view showing a configuration of a projector as an example of electronic apparatus to which the electro-optic device is applied.

Subsequently, a case in which the liquid crystal device as the electro-optic device described above is applied to various types of electronic apparatuses will be described. Here, a projecting-type liquid crystal projector is exemplified as an electronic apparatus according to the invention. FIG. 10 is a diagrammatic cross-sectional view of the projecting-type liquid crystal projector according to the embodiment.

In FIG. 10, a liquid crystal projector 1100 according to the embodiment is constructed as a multiple plate color projector using three liquid crystal light valves 100R, 100G, and 100B for RGB, respectively. The liquid crystal light valves 100R, 100G, and 100B each employ a reflective liquid crystal device described above.

As shown in FIG. 10, in the liquid crystal projector 1100, if projecting light is emitted from a lamp unit 1102 as a white light source such as metal halide lamp, the emitted light is split into light components R, G, and B corresponding to the three primary colors of RGB by the two mirrors 1106, two dichroic mirrors 1108, and three polarization beam splitters (PBS) 1113, and the light is guided respectively to the liquid crystal light valves 100R, 100G, and 100B corresponding to the respective colors. In this case, a lens may be provided as needed in the midpoint of an optical path in order to prevent light loss in the optical path. Then, the light components corresponding to the three primary colors modulated respectively by the liquid crystal light valves 100R, 100G, and 100B are combined by a cross prism 1112, and then projected on a screen 1120 via a projection lens 1114 as a color video.

Since the lights corresponding to the respective primary colors, namely, R, G, and B enter the liquid crystal light valves 100R, 100G, and 100B by the dichroic mirror 1108 and the polarization beam splitters 1113, so that it is not necessary to provide a color filter.

In addition to the electronic apparatus described with reference to FIG. 10, mobile personal computers, cellular phones, liquid crystal TVs, view-finder type and monitor direct view video tape recorders, car navigation apparatuses, pagers, electronic notepads, calculators, word processors, work stations, TV telephone sets, POS terminals, apparatuses having a touch panel, and so on are exemplified. Needless to say, the electro-optic device in the invention can be applied to the various types of electronic apparatuses exemplified above.

In addition to the reflective liquid crystal apparatus in the embodiments described above, the invention is also applicable to transmissive liquid crystal apparatuses, plasma displays (PDP), Field Emission Displays (FED, SED), organic EL displays, Digital Micromirror Device (DMD), and electrophoresis apparatuses.

The invention is not limited to the embodiments described above, and may be modified as needed without departing the scope and thought of the invention read from Claims and the entire specification. Therefore, the electro-optic device modified in a manner described above and the electronic apparatus having the modified electro-optic device are also included in a technological range of the invention.

The entire disclosure of Japanese Patent Application No. 2010-43849, filed Mar. 1, 2010 is expressly incorporated by reference herein.

What is claimed is:

1. An electro-optic device comprising:
    an electro-optic panel having a pair of substrates;
    a dust-proof substrate attached to one of the pair of substrates; and
    a holding member having a supporting portion that supports an end portion of the dust-proof substrate and a main body portion arranged so as to surround the electro-optic panel;
    wherein:
        the supporting portion and the end portion of the dust-proof substrate are attached with an adhesive agent at a plurality of positions of the supporting portion near sides of the dust-proof substrate such that the adhesive agent at each of the plurality of positions does not extend into an inclusive corner region of the dustproof substrate,
        the adhesive agent is disposed between the dust-proof substrate and the supporting portion in a region outside the electro-optic panel in plan view.

2. The electro-optic device according to claim 1, wherein the outline shape of the dust-proof substrate is larger than the outline shape of the electro-optic panel.

3. The electro-optic device according to claim 1, wherein the main body portion includes a mounting portion formed so as to project toward a mounted member, and
    the supporting portion is formed so as to be depressed in comparison with the mounting portion.

4. The electro-optic device according to claim 1, wherein the main body portion has an opening corresponding to a pixel area of the electro-optic panel, and
    the supporting portion is formed along an edge of the opening.

5. The electro-optic device according to claim 1, wherein the supporting portion is formed so as to project from the main body portion in a convex manner in plan view.

6. The electro-optic device according to claim 1, wherein the supporting portion includes an opening for adhesion, and
    the dust-proof substrate is fixed to the supporting portion with the adhesive agent filled in the opening for adhesion.

7. The electro-optic device according to claim 1, comprising a light-shielding panel provided so as to come into contact with the dust-proof substrate and the main body portion from a side of the dust-proof substrate opposite from a surface attached to the electro-optic panel, and formed so as to surround at least partly the pixel area of the electro-optic panel in plan view.

8. The electro-optic device according to claim 1, comprising a heat radiating member provided on the electro-optic panel on the side opposite from a surface where the dust-proof substrate is attached.

9. The electro-optic device according to claim 8, wherein the heat radiating member is adhered to the holding member.

10. The electro-optic device according to claim 8, comprising a hook member that fixes the heat radiating member to the holding member from the side of the heat radiating member opposite from a surface opposing the electro-optic panel.

11. The electro-optic device according to claim 1, wherein the electro-optic panel is of a reflective type.

12. An electronic apparatus comprising the electro-optic device according to claim 1.

13. The electro-optic device according to claim 1, wherein the plurality of positions of the supporting portion are each disposed apart from each other.

14. The electro-optic device according to claim 1, wherein the dust-proof substrate is attached to one of the pair of substrates with an adhesive agent.

15. An electro-optic device comprising:
    an electro-optic panel having a first substrate and a second substrate;
    a third substrate attached to one of the first substrate and the second substrate; and
    a holding member having a supporting portion that supports an end portion of the third substrate and a main body portion arranged so as to surround the electro-optic panel;
    wherein:
        the supporting portion and the end portion of the third substrate are attached with an adhesive agent at a plurality of positions of the supporting portion near sides of the third substrate such that the adhesive agent at each of the plurality of positions does not extend into an inclusive corner region of the third substrate,
        the adhesive agent is disposed between the third substrate and the supporting portion in a region outside the electro-optic panel in plan view.

16. The electro-optic device according to claim 15, wherein the plurality of positions of the supporting portion are each disposed apart from each other.

17. The electro-optic device according to claim 15, wherein the third substrate is attached to one of the first substrate and the second substrate with an adhesive agent.

18. The electro-optic device according to claim 15, wherein the outline shape of the third substrate is larger than the outline shape of the electro-optic panel.

19. The electro-optic device according to claim 15, wherein the main body portion includes a mounting portion formed so as to project toward a mounted member, and
the supporting portion is formed so as to be depressed in comparison with the mounting portion.

20. The electro-optic device according to claim 15, wherein the main body portion has an opening corresponding to a pixel area of the electro-optic panel, and
the supporting portion is formed along an edge of the opening.

21. The electro-optic device according to claim 15, further comprising a light-shielding panel provided so as to come into contact with the third substrate and the main body portion from a side of the third substrate opposite from a surface attached to the electro-optic panel, and formed so as to surround at least partly the pixel area of the electro-optic panel in plan view.

22. The electro-optic device according to claim 15, further comprising a heat radiating member provided on the electro-optic panel on the side opposite from a surface where the third substrate is attached.

23. The electro-optic device according to claim 22, wherein the heat radiating member is adhered to the holding member.

24. The electro-optic device according to claim 22, further comprising a hook member that fixes the heat radiating member to the holding member from the side of the heat radiating member opposite from a surface opposing the electro-optic panel.

25. The electro-optic device according to claim 15, wherein the electro-optic panel is of a reflective type.

26. An electronic apparatus comprising the electro-optic device according to claim 15.

27. An electro-optic device comprising:
an electro-optic panel having a first substrate and a second substrate;
a third substrate attached to one of the first substrate and the second substrate;
a holding member having a supporting portion that supports an end portion of the third substrate and a main body portion arranged so as to accommodate the electro-optic panel;
wherein:
the supporting portion and the end portion of the third substrate are attached with an adhesive agent at a plurality of positions of the supporting portion near sides of the third substrate such that the adhesive agent at each of the plurality of positions does not extend into an inclusive corner region of the third substrate,
the adhesive agent is disposed between the third substrate and the supporting portion in a region outside the electro-optic panel in plan view.

28. The electro-optic device according to claim 27, wherein the plurality of positions of the supporting portion are each disposed apart from each other.

29. The electro-optic device according to claim 27, wherein the third substrate is attached to one of the first substrate and the second substrate with an adhesive agent.

30. The electro-optic device according to claim 27, wherein the outline shape of the third substrate is larger than the outline shape of the electro-optic panel.

31. The electro-optic device according to claim 27, wherein the main body portion includes a mounting portion formed so as to project toward a mounted member, and
the supporting portion is formed so as to be depressed in comparison with the mounting portion.

32. The electro-optic device according to claim 27, wherein the main body portion has an opening corresponding to a pixel area of the electro-optic panel, and
the supporting portion is formed along an edge of the opening.

33. The electro-optic device according to claim 27, further comprising a light-shielding panel provided so as to come into contact with the third substrate and the main body portion from a side of the third substrate opposite from a surface attached to the electro-optic panel, and formed so as to surround at least partly the pixel area of the electro-optic panel in plan view.

34. The electro-optic device according to claim 27, further comprising a heat radiating member provided on the electro-optic panel on the side opposite from a surface where the third substrate is attached.

35. The electro-optic device according to claim 34, wherein the heat radiating member is adhered to the holding member.

36. The electro-optic device according to claim 34, further comprising a hook member that fixes the heat radiating member to the holding member from the side of the heat radiating member opposite from a surface opposing the electro-optic panel.

37. The electro-optic device according to claim 27, wherein the electro-optic panel is of a reflective type.

38. An electronic apparatus comprising the electro-optic device according to claim 27.

39. The electro-optic device according to claim 1, wherein the main body portion has a plurality of holes, and
the main body portion is fixed to a member via the plurality of holes.

* * * * *